US008919314B2

(12) United States Patent
Saito et al.

(10) Patent No.: US 8,919,314 B2
(45) Date of Patent: Dec. 30, 2014

(54) ENGINE CONTROL APPARATUS

(75) Inventors: Tatsuya Saito, Chiryu (JP); Nobuhiko Shima, Kariya (JP); Tetsuo Morita, Nagoya (JP)

(73) Assignee: Denso Corporation, Kariya (JP)

( * ) Notice: Subject to any disclaimer, the term of this patent is extended or adjusted under 35 U.S.C. 154(b) by 447 days.

(21) Appl. No.: 13/239,861

(22) Filed: Sep. 22, 2011

(65) Prior Publication Data

US 2012/0080001 A1 Apr. 5, 2012

(30) Foreign Application Priority Data

Sep. 30, 2010 (JP) ................................. 2010-220610

(51) Int. Cl.
*F02N 11/08* (2006.01)

(52) U.S. Cl.
CPC ..... *F02N 11/0822* (2013.01); *F02N 2200/0801* (2013.01); *F02N 2200/102* (2013.01); *Y02T 10/48* (2013.01)
USPC ..................... 123/179.4; 123/196 S; 701/113

(58) Field of Classification Search
CPC . F02D 41/042; F02D 41/062; F02N 11/0814; F02N 11/0818; F02N 11/0855; F01M 1/02; F01M 1/16; B60W 10/06; B60W 20/00
USPC ......... 123/179.1, 179.3, 179.4, 196 S, 198 D, 123/319, 320; 701/110, 112, 113; 477/4, 5, 477/184–187, 203–205
See application file for complete search history.

(56) References Cited

U.S. PATENT DOCUMENTS

| 6,190,284 | B1 | 2/2001 | Kuroda et al. | |
| 8,323,152 | B2* | 12/2012 | Albrecht ...................... | 477/184 |
| 8,326,520 | B2* | 12/2012 | Bollig et al. .................. | 701/113 |
| 2001/0013701 | A1* | 8/2001 | Onoyama et al. ........... | 290/40 C |
| 2003/0004635 | A1* | 1/2003 | Kamiya et al. ............... | 701/112 |
| 2003/0135321 | A1* | 7/2003 | Kumazaki et al. ............ | 701/112 |
| 2003/0173124 | A1* | 9/2003 | Okada et al. ................. | 180/65.2 |

(Continued)

FOREIGN PATENT DOCUMENTS

| JP | A-11-257122 | 9/1999 |
| JP | A-2000-2128 | 1/2000 |

(Continued)

OTHER PUBLICATIONS

Office Action issued in Japanese Patent Application No. 2010-220610 dated Jul. 16, 2013 (with translation).

(Continued)

*Primary Examiner* — John Kwon
*Assistant Examiner* — Johnny H Hoang
(74) *Attorney, Agent, or Firm* — Oliff PLC

(57) ABSTRACT

An engine control apparatus is configured to perform engine automatic stop to automatically stop an engine when predetermined engine stop conditions are satisfied and automatically restart the engine when predetermined engine restart conditions are satisfied. The stop conditions including that a vehicle speed decreases below a predetermined stop permission speed. The engine control apparatus includes a variation amount detection means for detecting a variation amount of a brake operation being performed by the vehicle driver during a deceleration period from when the vehicle has started to decelerate to when the vehicle speed has decreased below the stop permission speed, and a stop determination means for determining whether the engine automatic stop should be performed when the engine stop conditions are satisfied based on the variation amount detected by the variation amount detection means.

8 Claims, 6 Drawing Sheets

(56) References Cited

U.S. PATENT DOCUMENTS

2005/0143901 A1* 6/2005 Scholt et al. .................. 701/112
2008/0201064 A1* 8/2008 DiGonis ........................ 701/110
2010/0279816 A1* 11/2010 Soliman ............................ 477/3

FOREIGN PATENT DOCUMENTS

| | | |
|---|---|---|
| JP | A-2000-2129 | 1/2000 |
| JP | A-2005-23908 | 1/2005 |
| JP | A-2009-57946 | 3/2009 |
| WO | WO 2010/063383 A1 | 6/2010 |

OTHER PUBLICATIONS

Jan. 26, 2014 Office Action issued in Chinese Patent Application No. 201110305483.2.

* cited by examiner

US 8,919,314 B2

ENGINE CONTROL APPARATUS

This application claims priority to Japanese Patent Application No. 2010-220610 filed on Sep. 30, 2010, the entire contents of which are hereby incorporated by reference.

BACKGROUND OF THE INVENTION

1. Field of the Invention

The present invention relates to an engine control apparatus.

2. Description of Related Art

There is known the so-called idle stop control in which a vehicle engine in idle state is automatically stopped when predetermined stop conditions are satisfied, and the engine is automatically restarted when predetermined restart conditions are satisfied thereafter, as described, for example in Japanese Patent Applicant Laid-open No. H11-257122. This patent document describes stopping an engine during deceleration of a vehicle if the shift position of the transmission of the vehicle is at the forward drive position and the brake pedal of the vehicle is depressed, in order to prevent useless idling of the engine to thereby reduce fuel consumption.

However, it may occur that the vehicle driver is willing that the engine continues to run although the vehicle driver depresses the brake pedal during deceleration of the vehicle. If the engine is stopped by the idle stop (IS) control against the vehicle driver's will, there may occur a disadvantage that the vehicle cannot be accelerated promptly, or the fuel consumption becomes worse contrary to expectations.

SUMMARY

An exemplary embodiment provides an engine control apparatus for a vehicle with an engine and a brake device for applying a brake force to the vehicle in accordance with an amount of operation of the brake device by a vehicle driver, the engine control apparatus being configured to perform engine automatic stop to automatically stop the engine when predetermined, engine stop conditions are satisfied and automatically restart the engine when predetermined engine restart conditions are satisfied, the stop conditions including that a vehicle speed decreases below a predetermined stop permission speed, comprising:

a variation amount detection means for detecting a variation amount of a brake operation being performed by the vehicle driver during a deceleration period from when the vehicle has started to decelerate to when the vehicle speed has decreased below the stop permission speed; and a stop determination means for determining whether the engine automatic stop should be performed when the engine stop conditions are satisfied based on the variation amount detected by the variation amount detection means.

According to the exemplary embodiment, there is provided an engine control apparatus capable of performing engine automatic stop properly respecting the vehicle driver's will.

Other advantages and features of the invention will become apparent from the following description including the drawings and claims.

PREFERRED EMBODIMENTS OF THE INVENTION

Figure 1:
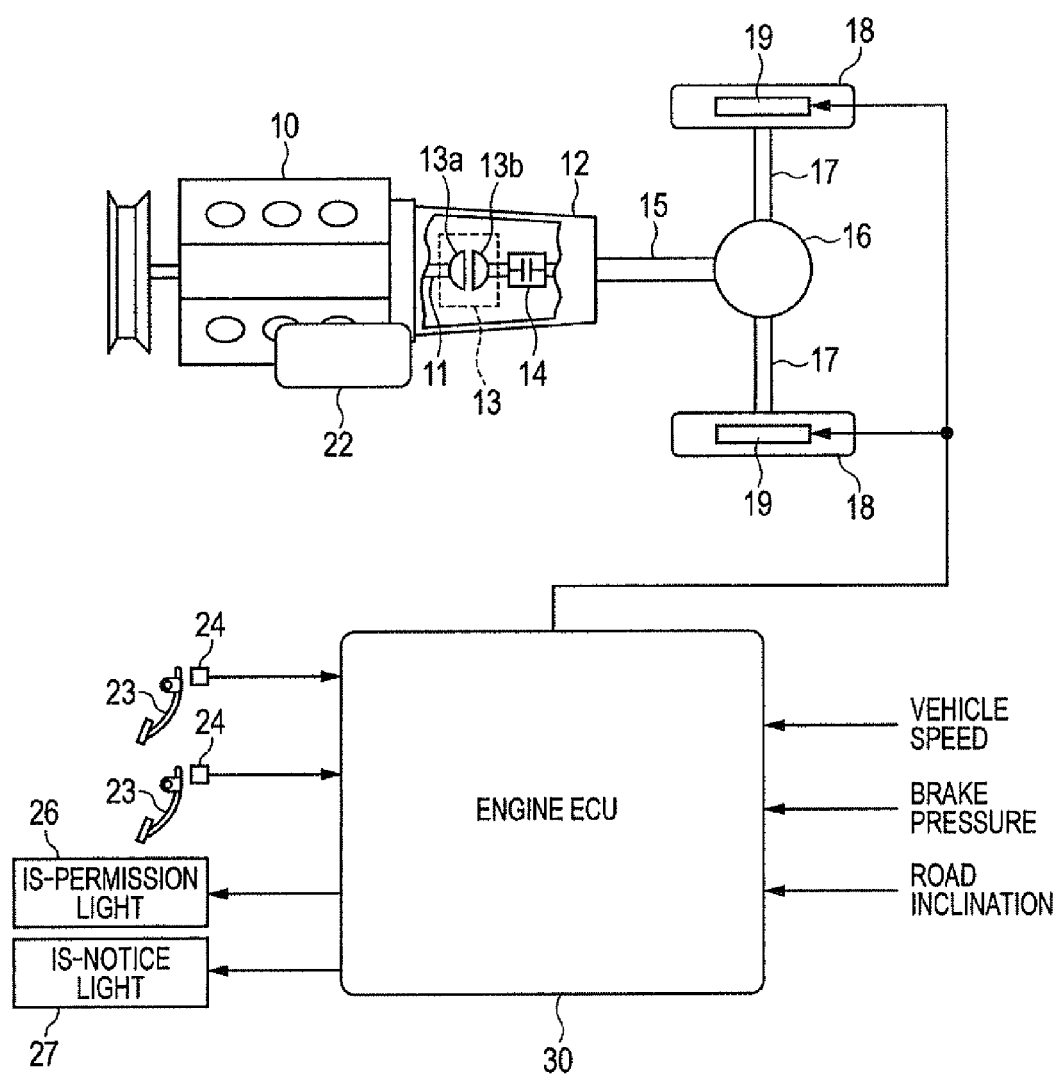
FIG. 1 is a diagram showing a schematic structure of a vehicle control system including an engine control apparatus according to an embodiment of the invention.

FIG. 1 is a diagram showing the schematic structure of a vehicle control system including an engine control apparatus according to an embodiment of the invention, this system being mounted on a vehicle having an engine 10 and an automatic transmission 12.

The engine 10 is a multiple-cylinder engine having injectors and ignitors (not shown). The engine 10 has an output shaft (crankshaft) 11 coupled to the automatic transmission 12. The automatic transmission 12 includes a torque converter 13 and an automatic transmission mechanism 14, and is configured to convert the torque of the crankshaft 11 in accordance with a set transmission gear ratio and transmit it to a transmission output shaft 15. More specifically, the torque converter 13 is a fluid clutch constituted of a pump impeller 13a connected to the crankshaft 11, and a turbine runner 13b connected to the input shaft of the automatic transmission mechanism 14. The torque converter 13 transmits power received from the engine 10 to the automatic transmission mechanism 14.

The transmission output shaft 15 is coupled to drive wheels 18 of the vehicle through a differential gear 16 and an axle 17. Each of the drive wheels 18 is provided with a brake actuator 19 configured to apply a brake force to the drive wheel 18 when driven by a hydraulic circuit (not shown). The brake actuator 19 is configured to adjust a brake force applied to the drive wheel 18 in accordance with the pressure of a master cylinder (not shown) that transmits a depression force of a brake pedal 21 to the hydraulic oil.

The vehicle control system 1 also includes a starter 22 for applying an initial rotation (cranking rotation) to the engine 10 to start the engine 10.

An ECU 30, which is mainly constituted of a microcomputer including a CPU, a ROM and a RAM, performs various controls to run the vehicle by executing various control programs stored in the ROM. More specifically, the ECU 30 performs various engine controls including fuel injection control by way of the injectors and ignition control by way of the ignitors, drive control of the starter 22, brake control by way of the brake actuators 19, and transmission gear ratio control by way of the automatic transmission 12. The ECU 30 is connected with various sensors including an accelerator sensor 24 for detecting a depression amount of an accelerator pedal 23, a brake sensor 25 for detecting a depression amount of the brake pedal 21, a vehicle speed sensor (not shown), a brake pressure sensor for detecting the pressure inside the master cylinder (not shown), and a G-sensor (not shown) for detecting acceleration of the vehicle. Detection signals outputted from these sensors are inputted to the ECU 30. Although not shown in the drawings, the vehicle control system 1 also includes a rotational speed sensor for detecting the rotational speed of the engine 10, and load sensors such as an air flow meter and a suction pressure sensor.

Next, idle stop control performed by the vehicle control system 1 is explained. The idle stop control operates to automatically stop the engine 10 in idle state when predetermined engine stop conditions ire satisfied, and automatically restarts the engine 10 when predetermined restart conditions are satisfied in order to reduce fuel consumption of the engine 10. The engine stop conditions include that the vehicle speed decreases below a predetermined IS-permission speed Vis. In this embodiment, the IS-permission speed Vi is set above a creep speed range in which the vehicle can run using a creep force, for example, set to 7 km/h.

The engine stop conditions may further include at least one of that the brake pedal is operated, that an operation amount of the accelerator pedal is 0, that the shift position of the automatic transmission 12 is at the drive position (D-range, for example), and that the battery voltage of a vehicle battery is above a predetermined voltage. The engine restart conditions include at least one of that the accelerator pedal is operated when the engine is in stopped state, and that the brake pedal operation is released.

In this embodiment, the idle stop control operates to inhibit engine automatic stop after engine has been restarted until the vehicle speed exceeds a first threshold speed Vth1. When the vehicle is caught in a traffic jam, the vehicle driver is likely to depress and release the brake pedal 12 repeatedly to cause vehicle to creep. According to this engine stop inhibition control, it is possible to prevent automatic engine stop/restart from being performed too frequently when the vehicle is caught in a traffic jam.

The vehicle control system 1 further includes an IS-permission light 26 and an IS-notice light to inform the vehicle driver in advance that the engine automatic stop will be performed. These lights 26 and 27 are mounted on places easy to see, for example, on the front panel of the vehicle.

However, it may occur that the vehicle driver is willing that the engine continues to run even when the engine stop conditions are satisfied. In this case, if the engine is automatically stopped against the vehicle driver's will, the vehicle driver may feel discomfort. More specifically, the vehicle driver may hear an engine start sound unexpectedly, or the vehicle does not start promptly. Further, performing the engine automatic stop may cause the fuel consumption of the vehicle to lower, because a certain amount of fuel is needed to restart the engine.

Incidentally, there is a tendency that variation amount of a brake operation (depression of the brake pedal) is relatively small when the vehicle driver operates the brake pedal with purpose of stopping the vehicle. Accordingly, in this embodiment, it is determined whether the engine automatic stop should be performed during deceleration of the vehicle based on variation amount of the brake pedal operation by the vehicle driver. This is because if the vehicle driver is willing to stop the vehicle (engine) at a target position, the vehicle driver depresses the brake pedal 21 to a certain stroke position to stop the vehicle at the target position, and keep the brake pedal 21 at this certain stroke position until the vehicle is stopped at the target position with a constant deceleration. In this case, the operation amount of the brake pedal 21 does not vary much during a deceleration period of the vehicle.

On the other hand, if variation amount of the brake pedal operation is relatively large, it is difficult to determine whether the vehicle driver is willing to stop the vehicle. Accordingly, in this case, it may occur that the engine is automatically stopped against the vehicle driver's will. In view of the above, the vehicle control system 1 is configured to perform the engine automatic stop when the engine stop conditions are satisfied, if variation amount of the brake pedal operation during a period from when the vehicle starts deceleration to when the engine stop conditions are satisfied is smaller than or equal to a predetermined value, and not to perform the engine automatic stop regardless of whether the engine stop conditions are satisfied, if the variation amount is larger than the predetermined value. This makes it possible to perform the engine automatic stop only when the vehicle driver is willing to cause the engine to be stopped.

Further, the vehicle control system 1 is configured to confirm the vehicle driver's will regarding the engine automatic stop based on variation amount the brake pedal operation before the vehicle speed decreases below the IS-permission speed Vis, and to set the IS-permission speed Vis to a value above the creep speed range so that the confirmation of the vehicle driver's will is performed in a range higher than the creep speed range.

This is because it is necessary to increase a depression amount of the brake pedal 21 with the decrease of the vehicle speed to keep constant the deceleration of the vehicle in the creep speed rang, and a depression amount of the brake pedal is large when the vehicle driver is willing to stop the engine.

In this embodiment, the confirmation of the vehicle driver's will regarding the engine automatic stop is performed as a temporary confirmation in a first vehicle speed range A (while the vehicle speed is within a first vehicle speed range A) above the IS-permission speed Vis to determine whether the engine automatic stop should be performed when the engine stop conditions are satisfied. If it is found that variation amount of the brake pedal operation is smaller than the predetermined value, the confirmation of the vehicle driver's will is performed again as a final confirmation in a second vehicle speed range B (while the vehicle speed is within a second vehicle speed range B) which is set above the IS-permission speed range Vi and below the first speed range A.

Figure 2:
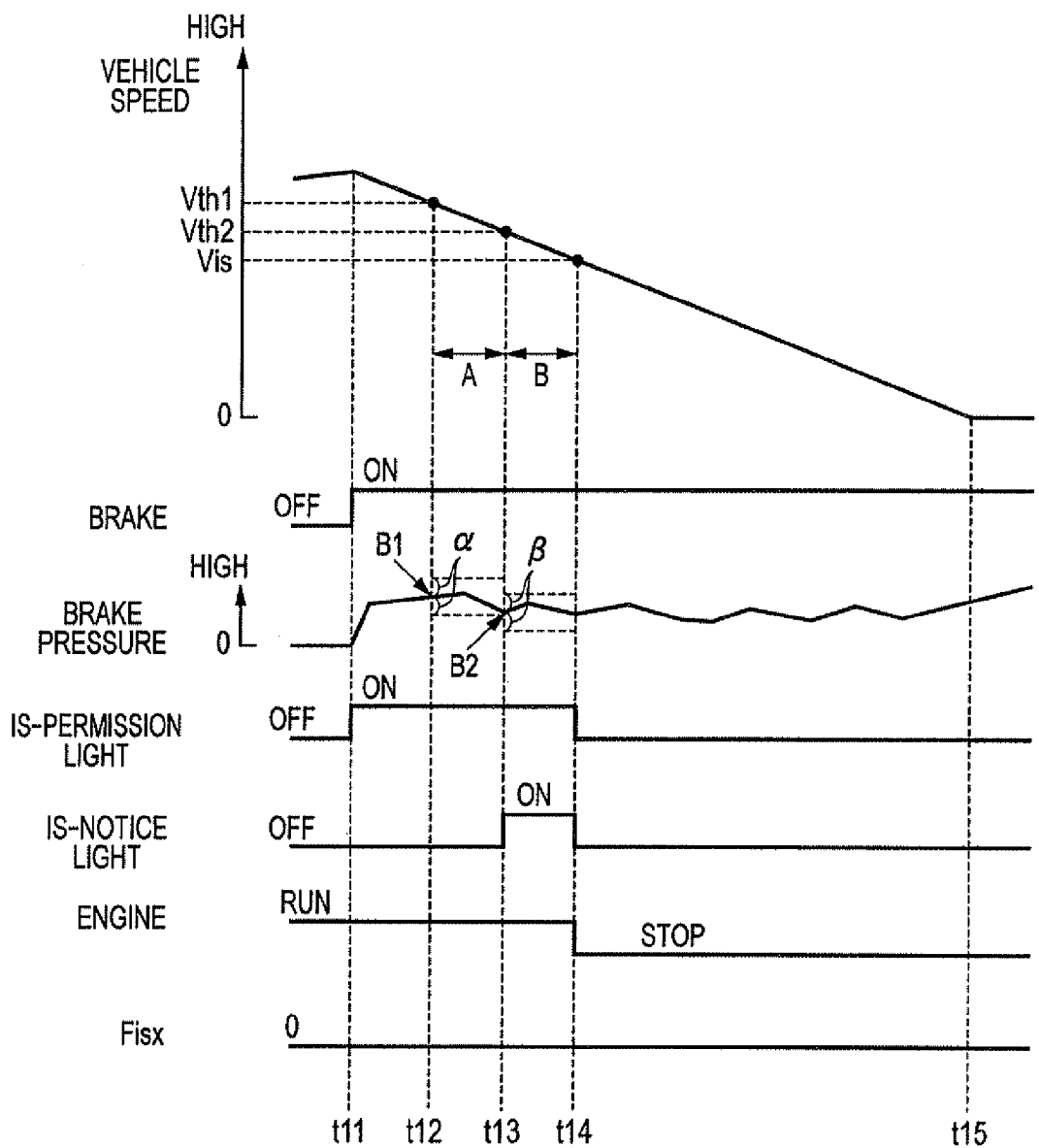
FIG. 2 is a time chart showing an example of operation of the vehicle control system when an engine automatic stop is performed.
Figure 3:
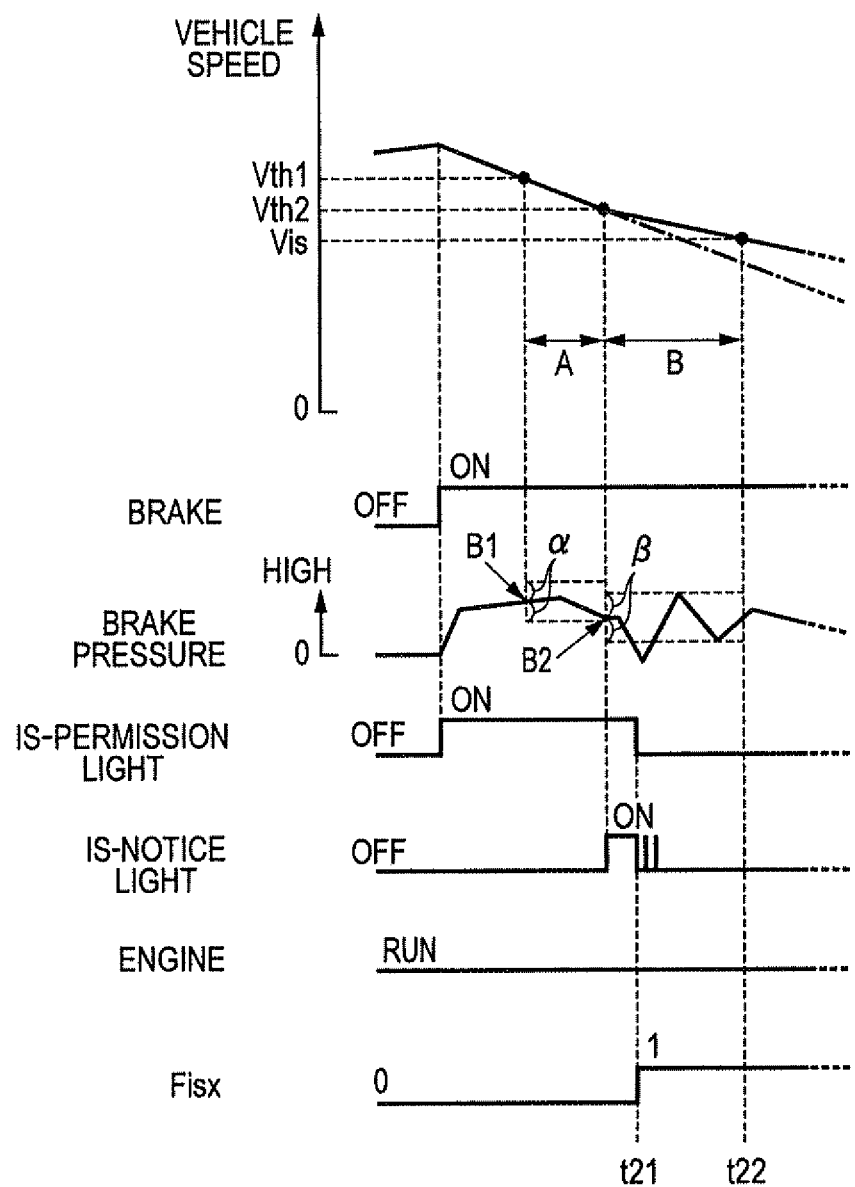
FIG. 3 is a time chart showing an example of operation of the vehicle control system when an engine automatic stop is not performed.

FIG. 2 is a time chart showing an example of operation of the vehicle control system 1 when the engine automatic stop is performed. FIG. 3 is a time chart showing an example of operation of the vehicle control system 1 when the engine automatic stop is not performed. FIGS. 2 and 3 show cases where the vehicle speed exceeds the first threshold speed Vth1 (12 km/h, for example) and accordingly the engine automatic stop is allowed.

In FIG. 2, when the engine stop conditions are satisfied except for the vehicle speed condition at timing t11, the IS-permission light 26 is turned on at this timing t11. In the first vehicle speed range A from the first threshold speed Vth1 to the second threshold speed (10 km/h, for example), a determination (temporary determination) is made as to whether variation of the present break pressure from the break pressure at timing at which the vehicle speed has passed the first threshold speed Vth1 (referred to as "the first reference brake pressure B1" hereinafter) is smaller than or equal to a predetermined value $\alpha$, and the deceleration of the vehicle is smaller than or equal to a threshold value $\delta 1$. In this embodiment, the value of the brake pressure detected by the brake pressure sensor is used as the brake operation amount.

The threshold values $\delta 1$ is set to an upper limit value of the vehicle deceleration below which there can be ensured a fuel consumption reference time (5 seconds, for example) which is a time necessary to obtain a fuel economy effect by stopping the engine during a period from when the engine is stopped to when the vehicle is stopped, if the engine 10 is stopped at a timing when the vehicle speed reaches the IS-permission speed Vis. That is, in this embodiment, when the deceleration of the vehicle is lower than or equal to the threshold value δ1, the engine automatic stop is performed because the fuel consumption reference time can be ensured during a period from when the engine is stopped to when the vehicle is stopped. On the other hand, when the deceleration of the vehicle is higher than the threshold value δ1, the engine automatic stop is not performed even if the vehicle driver is willing to stop the engine, because the fuel consumption reference time cannot be ensured during this period.

Returning to FIG. 2, if the above brake pressure variation is within the predetermined value α in the first vehicle speed range A, and the vehicle deceleration is smaller than or equal to the threshold value δ1, the IS-notice light 27 is turned on at timing t13 when the vehicle speed reaches the second threshold speed Vth2 with an engine stop inhibition flag Fisx being kept at 0.

In the second vehicle speed range B from the first threshold speed Vth1 to the second threshold speed Vth2, a determination (final determination) is made as to whether variation of the present break pressure from the break pressure at a timing at which the vehicle speed has passed the second threshold speed (referred to as "the second reference brake pressure B2" hereinafter) is smaller than or equal to a predetermined value β, and the deceleration of the vehicle is smaller than or equal to a threshold value δ2 (true determination). The vehicle driver can know in advance that the engine 10 will be automatically stopped by the IS-notice light being turned on. Further, by confirming the vehicle driver is will regarding the engine automatic stop after the IS-notice light 27 is turned on to notify that the engine will be automatically stopped, the vehicle driver can show the vehicle that the vehicle driver is not willing to cause the engine 10 to be automatically stopped by releasing depression of the brake pedal 21 or increasing depression of the brake pedal 21 in the second vehicle speed range B.

The threshold value β may be the same as or different from the predetermined value α. The threshold value δ2 may be the same as or different from the threshold value δ1.

If the brake pressure variation is smaller than the predetermined value β in the second speed range B, the engine stop inhibition flag Fisx is kept at 0, and thereafter when the vehicle speed decreases below the IS-permission speed Vis and the engine stop conditions are satisfied at timing t14, the engine automatic stop is performed at this timing t14.

On the other hand, if the vehicle driver releases depression of the brake pedal 21 in the second speed range B after the IS-notice light 27 is turned on, since the brake pressure variation exceeds the predetermined value β, the engine stop inhibition flag Fisx is set to 1 at timing t21 as shown in FIG. 3. Also, at timing t21, the IS-notice light 27 is blinked, and then turned off together with the IS-permission light 26. In this case, the engine 10 is not automatically stopped at timing t22 even if the vehicle speed decreases below the IS-permission speed Vis.

Conversely, if the vehicle driver increases a depression amount of the brake pedal 21 in the second speed range B after the IS-notice light 27 is turned on, since the brake pressure variation exceeds the predetermined value β, the engine automatic stop is performed.

Although not shown in the drawings, the above explanation with reference to FIG. 3 also applies to a case where the brake operation amount changes greatly. That is, when the brake operation amount changes greatly in the first vehicle speed range A at a certain timing, the IS-permission light 26 is blinked and then turned off at this timing. In this case, when the engine stop conditions including the vehicle speed condition are satisfied thereafter, the engine 10 is not automatically stopped.

Figure 4:
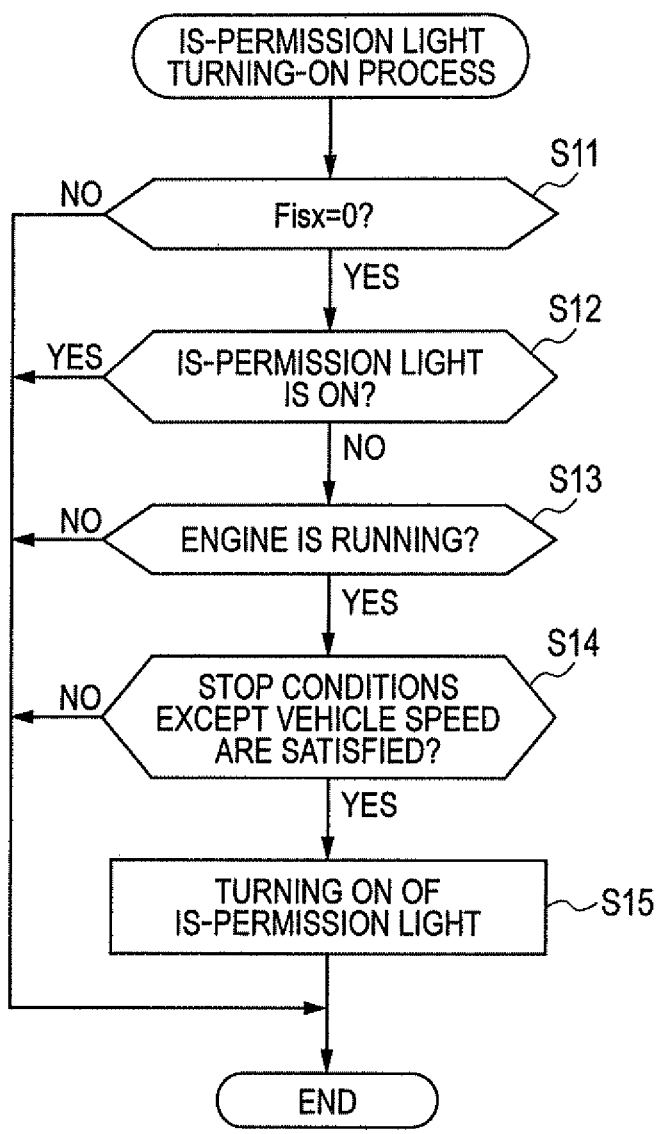
FIG. 4 is a flowchart showing an IS-permission light turning-on process.
Figure 5:
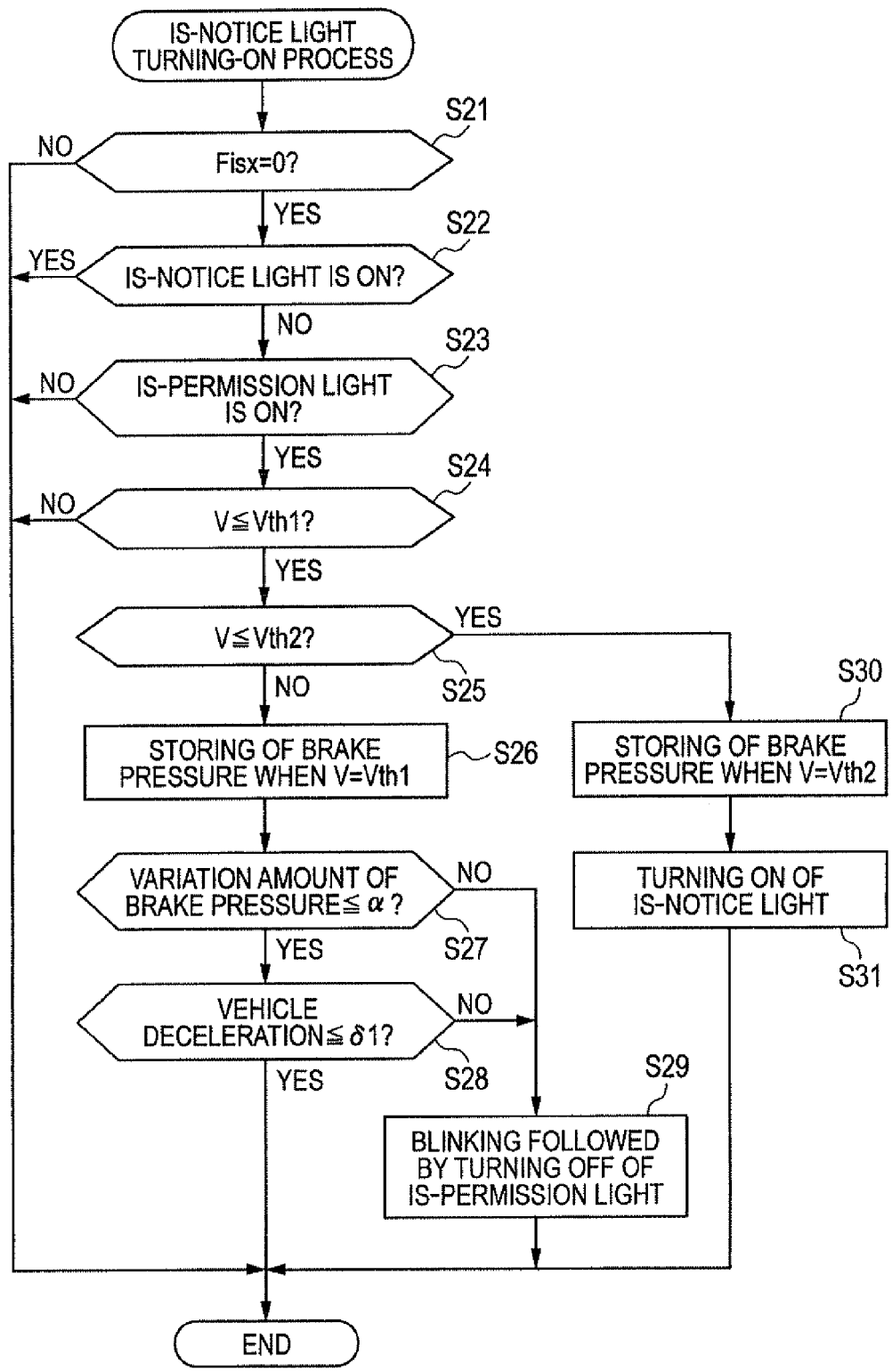
FIG. 5 is a flowchart showing an IS-notice light turning-on process.
Figure 6:
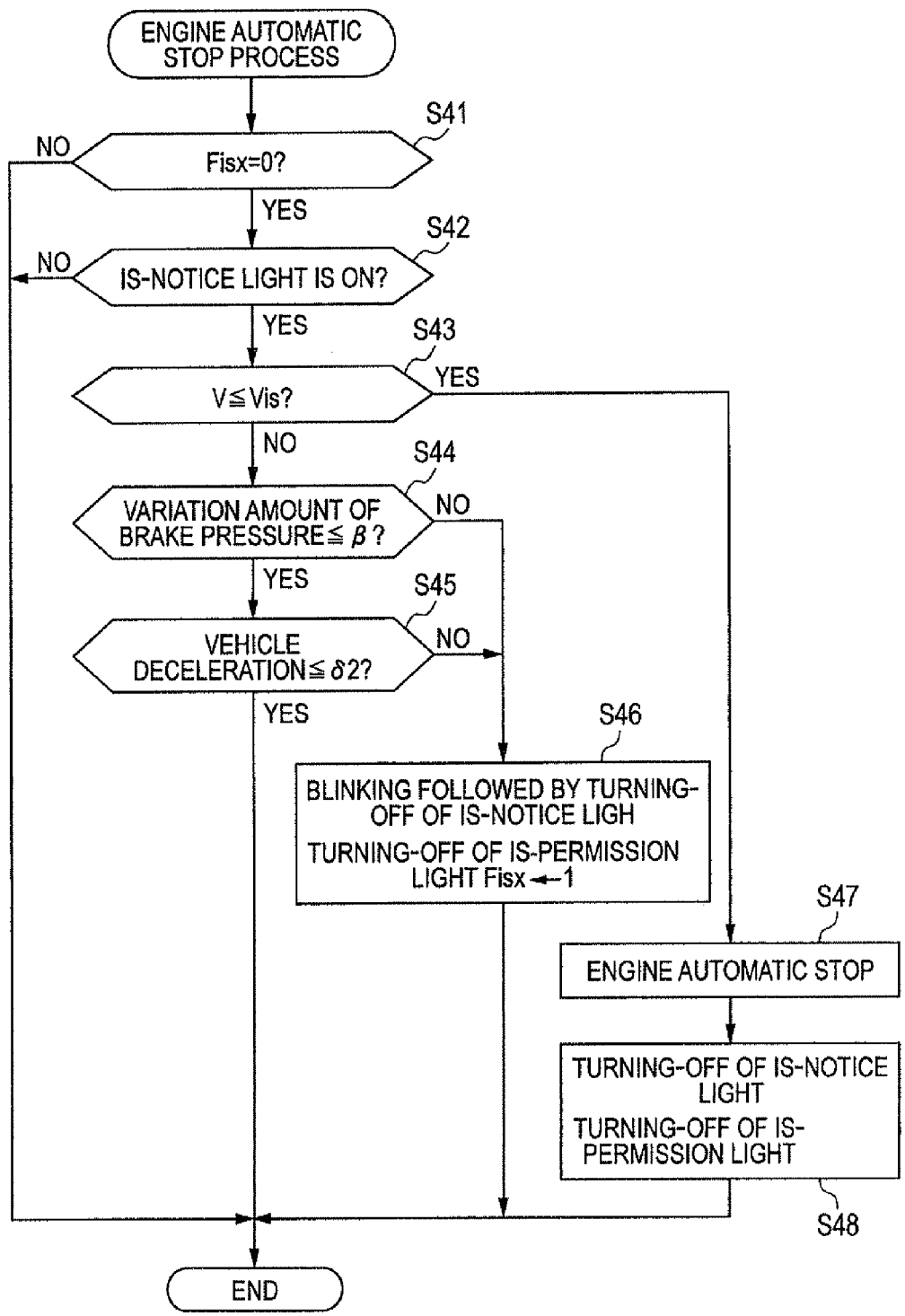
FIG. 6 is a flowchart showing an engine automatic stop process performed by the vehicle control system.

Next, the engine automatic stop process by the idle stop control performed in this embodiment is explained with reference to FIGS. 4 to 6. FIG. 4 is a flowchart showing a turning-on process of the IS-permission light 26. FIG. 5 is a flowchart showing a turning-on process of the IS-notice light 27. FIG. 6 is a flowchart showing the engine automatic stop process performed by the vehicle control system 1.

First, the IS-permission light turning-on process is explained with reference to the flowchart of FIG. 4. This process begins by determining in step S11 whether or not the engine stop inhibition flag Fisx is at 0. The engine stop inhibition flag Fisx is a flag which is set to 1 during a period in which the engine automatic stop is inhibited. In this embodiment, the engine stop inhibition flag Fisx is set to 1 after the engine is restarted and before the vehicle speed exceeds the first threshold speed Vth1, or when the engine automatic stop is not allowed during deceleration of the vehicle based on the brake pressure variation.

If the determination result in step S11 is affirmative, the process proceeds to step S12 to determine whether or not the IS-permission light 26 is on. If the determination result in step S12 is affirmative, the process proceeds to step S13 to determine whether or not the engine is running. If the determination result in step S13 is affirmative, the process proceeds to step S14 to determine whether or not the engine stop conditions except the speed condition have been satisfied. If the determination result in step S14 is affirmative, the process proceeds to step S15 to turn on the IS-permission light 26, and then this process is terminated. If the determination result in any one of steps S11 to S14 is negative, this process is terminated promptly.

Next, the IS-notice light turning-on process is explained with reference to the flowchart of FIG. 5. This process begins in step S21 to determine whether or not the engine stop inhibition flag Fisx is at 0. If the determination result in step S21 is affirmative, the process proceeds to step S22 to determine whether or not the IS-notice light 27 is on. If the determination result in step S22 is negative, the process proceeds to step S23 to determine whether or not the IS-permission light 26 is on.

If the determination result in step S23 is affirmative, the process proceeds to step S24 to determine whether or not the vehicle speed is lower than or equal to the first threshold speed Vth1. If the determination result in step S24 is affirmative, the process proceeds to step S25 to determine whether or not the vehicle speed is lower than or equal to the second threshold speed Vth2. If the determination result in step S25 is negative, the process proceeds to step S26 where the brake pressure detected by brake pressure sensor at a timing at which the vehicle speed has passed the first threshold speed Vth1 is stored as the first reference brake pressure B1.

In subsequent step S27, it is determined whether or not variation amount of the brake pressure is smaller than or equal to the predetermined value α. More specifically, it is determined whether or not a difference between the present brake pressure detected by the brake pressure sensor and the first reference brake pressure B1 is smaller than or equal to the predetermined value α. If the determination result in step S27 is affirmative, the process proceeds to step S28 to determine whether or not the vehicle deceleration is smaller than or equal to the threshold value δ1. If the determination result in step S27 or step S28 is negative, the process proceeds to step S29 to blink the IS-permission light 26 for a predetermined time and then turn off the IS-permission light 26, and to set the engine stop inhibition flag Fisx to 1.

If the determination results in steps S27 and S28 are both affirmative, the engine stop inhibition flag Flex is kept at 0.

Accordingly, determination results in steps S21 to S23 performed next time become affirmative. In this case, if the vehicle speed decreases below the second threshold speed Vth2, since an affirmative determination is made in step S24, the process proceeds to step S30 where the brake pressure detected by the brake pressure sensor at a timing at which the vehicle speed has passed the second threshold speed Vth2 is stored as the second reference brake pressure B2. Subsequently, the IS-permission light 27 is turned on, and then the process is terminated.

Next, the engine automatic stop process is explained with reference to the flowchart of FIG. 6. This process begins by determining whether or not the engine stop inhibition flag Fisx is at 0 in step S41. If the determination result in step S41 is affirmative, the process proceeds to step S42 to determine whether or not the IS-notice light 27 is on. If the determination result in step S42 is affirmative, the process proceeds to step S43 to determine whether or not the vehicle speed is lower than or equal to the IS-permission speed Vis. If the determination result in step S43 is negative, the process proceeds to step S44 to determine whether or not the brake pressure variation amount is smaller than or equal to the predetermined value $\beta$. More specifically, it is determined whether or not a difference between the present brake pressure detected by the brake pressure sensor and the second reference brake pressure B2 is smaller than or equal to the predetermined value $\beta$. If the determination result in step S44 is affirmative, the process proceeds to step S45 to determine whether or not the vehicle deceleration is smaller than or equal to the threshold value $\delta 2$. If the determination result in step S44 or step S45 is negative, the process proceeds, to step S46 to blink the IS-notice light 27 for a predetermined time and then turn off the IS-notice light 27, to turn off the IS-permission light 26, and to set the engine stop inhibition flag Fisx to 1.

If the determination results in steps S447 and S45 are both affirmative, the engine stop inhibition flag Fisx is kept at 0, and accordingly determination results in steps S41 to S42 performed next time become affirmative. In this case, if the vehicle speed decreases below the IS-permission speed Vis, since an affirmative determination is made in step S43, the process proceeds to step S47 where fuel injection and ignitions of the engine 10 are halted to automatically stop the engine 10. In subsequent step S48, the IS-permission light 26 and the IS-notice light are turned off, and then the process is terminated. The engine stop inhibition flag Fisx is reset to 0 when the vehicle speed becomes 0 or exceeds a predetermined speed.

The above described first embodiment provides the following advantages.

The above embodiment is configured to determine whether the engine automatic stop should be performed when the engine stop conditions are satisfied based on the variation amount of a brake operation being performed. More specifically, the above embodiment is configured to determine that the engine automatic stop should be performed when the engine stop conditions are satisfied if the variation amount of the brake operation is smaller than or equal to the predetermined value $\alpha$ or $\beta$, and otherwise should not be performed even when the engine stop conditions are satisfied. This makes it possible to perform the engine automatic stop in accordance with the vehicle driver's will.

The above embodiment is configured to not to perform the engine automatic stop even when the variation amount of a brake operation is smaller than or equal to the predetermined value $\alpha$ or $\beta$, if the vehicle deceleration is larger than the threshold value $\delta 1$ or $\delta 2$. This makes it possible to prevent the engine automatic stop when it does not contribute to reduction of fuel consumption.

The above embodiment is configured to make a determination whether the engine automatic stop should be performed based on a variation amount of a brake operation after the IS-permission light 26 or the IS-notice light 27 is turned on. This makes it possible to encourage the vehicle driver to perform a brake operation, or to release a brake operation to perform the engine automatic stop.

Further, since the IS-notice light 27 is not turned on or turned off after being blinked when the variation amount of a brake operation is larger than a predetermined value, the vehicle driver can know in advance that the engine automatic stop will not be performed during deceleration of the vehicle.

The above embodiment is configured to determine whether the IS-notice light 27 should be turned on in the second vehicle speed range B lower than the first vehicle speed range A based on a variation amount of a brake operation. This makes it possible for the vehicle control system 1 to determine whether it is necessary to notify the vehicle driver that the engine automatic stop will be performed.

The above embodiment is configured to confirm the vehicle driver's will regarding the engine automatic stop on the higher speed range than the creep speed range based on a variation amount of a brake operation in view of the fact that, to obtain feeling of stable deceleration in the creep speed range, it is necessary to increase a brake operation amount with the decrease of the vehicle speed. This makes it possible to suppress effects of a variation amount of a brake operation due to factors other than the vehicle driver's will.

Other Embodiments

It is a matter of course that various modifications can be made to the above embodiment as described below.

The above embodiment is configured to make a determination whether the engine automatic stop should be performed when the stop conditions are satisfied based on the two parameters that are a variation amount of a brake operation and a vehicle deceleration. However, the above embodiment may be modified to make the determination based on only the parameter of a variation amount of a brake operation. When a depression amount of the brake pedal 21 is increased while the vehicle decelerates, the vehicle deceleration increases and also a variation amount of the brake operation increases. That is, since there is a correlation between a variation amount of a brake operation and a vehicle deceleration, it is possible to determine whether it is possible to ensure a time long enough to obtain a fuel economy effect (the fuel consumption reference time) during a period from when the engine is stopped to when the vehicle is stopped.

The above embodiment is configured to not to turn on the IS-notice light 27, or to turn off the IS-notice light after blinking the IS-notice light when a variation amount of a brake operation is larger than a predetermined value. However, the above embodiment may be configured to notify the vehicle driver that the engine automatic stop will not be performed more positively. For example, the above embodiment may be configured to change the emission color of the light when the engine automatic stop will not performed from that when the engine automatic stop will be performed.

In the above embodiment, the ECU 30 as a notice control means is configured to inform the vehicle driver that the engine automatic stop will be performed by turning on the IS-permission light 26 and the IS-notice light 27 as notice means, and to notify the vehicle driver that the engine automatic stop will not be performed by turning off the IS-permission light 26 and the Is-notice light 27. However, the notice means is not limited to such lights. For example, the notice means may be a device capable of displaying or announcing "Idle Stop will be performed" or "Idle Stop will not be performed".

The above embodiment is configured to confirm the vehicle driver's will regarding the engine automatic stop based on variation of the present brake pressure (brake operation amount) from the brake pressure detected at the reference timing at which the vehicle speed passed the first threshold speed Vth1 or the second threshold speed Vth2. However, the above embodiment may be configured to confirm the vehicle driver's will regarding the engine automatic stop based on a variation amount of depression of the brake pedal for a predetermined time period.

The above embodiment is configured to confirm the vehicle driver's will regarding the engine automatic stop in each of the first speed area A and the second speed area B, and turn on the IS notice light 27 in the second speed area B depending on the result of confirmation made in the first speed area A as preliminary confirmation. However, the preliminary confirmation may be omitted. In this case, the IS notice light 27 may be turned on at a timing at which the vehicle speed decreases below the first threshold speed Vth1 or the second threshold speed Vth2.

In the above embodiment, the means to detect a variation amount of a brake operation is constituted of the brake pressure sensor and the ECU 30, and the vehicle driver's will regarding the engine automatic stop is confirmed based on a variation amount of the break pressure. However, the variation amount of a brake operation is not limited thereto.

For example, the means to detect a variation amount of the brake operation may be constituted of the brake sensor 21 to detect a depression amount of the brake pedal and the ECU 30. Further, this means may be constituted of a hydraulic pressure sensor for detecting the hydraulic pressure of a hydraulic circuit of the brake actuator 19, and the ECU 30.

In the above embodiment, the vehicle is equipped with the automatic transmission 12. However, the invention is applicable to a vehicle equipped with a manual transmission.

In the above embodiment, the vehicle has the gasoline engine 10. However, the invention is applicable to a vehicle having a diesel engine.

The above explained preferred embodiments are exemplary of the invention of the present application which is described solely by the claims appended below. It should be understood that modifications of the preferred embodiments may be made as would occur to one of skill in the art.

What is claimed is:

1. An engine control apparatus for a vehicle with an engine and a brake device for applying a brake force to the vehicle in accordance with an amount of operation of the brake device by a vehicle driver, the engine control apparatus comprising:
 a stop control that performs an engine automatic stop to automatically stop the engine when predetermined engine stop conditions are satisfied and automatically restart the engine when predetermined engine restart conditions are satisfied, the predetermined engine stop conditions including that a vehicle speed decreases below a predetermined stop permission speed that is set above a creep range in which the vehicle can run using a creep force;
 a variation amount detection device that detects a variable amount of a brake operation being performed by the vehicle driver during a deceleration period while the vehicle is decelerating but before the vehicle has stopped; and
 a stop determination device that determines whether the engine automatic stop should be performed when the engine stop conditions are satisfied based on the variable amount detected by the variation amount detection device while the vehicle is decelerating.

2. The engine control apparatus according to claim 1, wherein the stop determination device determines that the engine automatic stop should be performed when the engine stop conditions are satisfied if the variable amount is smaller than or equal to a predetermined amount, and determines that the engine automatic stop should not be performed even when the engine stop conditions are satisfied if the variable amount is larger than the predetermined amount.

3. The engine control apparatus according to claim 1, further comprising a speed determination device that determines whether or not vehicle deceleration is larger than a predetermined deceleration during the deceleration period, the stop determination device determines that the engine automatic stop should not be performed regardless of a determination result by the stop determination device.

4. The engine control apparatus according to claim 1, further comprising a notice control device that informs the vehicle driver that the engine automatic stop will be performed using a notice device thereof when predetermined part of the stop conditions are satisfied before all of the conditions are satisfied, the stop determination device determines whether the engine automatic stop should be performed based on the variable amount after the notice control device has informed the vehicle driver.

5. The engine control apparatus according to claim 4, wherein the notice control device causes the notice device to inform the vehicle driver that the engine automatic stop will not be performed if the stop determination device has determined that the engine automatic stop should not be performed.

6. The engine control apparatus according to claim 4, wherein the stop determination device includes a first determination device that determines whether or not the engine automatic stop should be performed when the stop conditions are satisfied based on the variable amount while the vehicle speed is within a first speed range during the deceleration period, and a second determination device that determines whether or not the engine automatic stop should be performed when the stop conditions are satisfied based on the variable amount and a determination result by the first determination device while the vehicle speed is within a second speed range lower than the first speed range during the deceleration period,
 the notice control device causes the notice device to inform the vehicle driver depending on a determination result by the first determination device while the vehicle speed is in the second speed range.

7. The engine control apparatus according to claim 1, wherein the vehicle has an automatic transmission with a torque converter, the stop determination device determines whether or not the engine automatic stop should be performed based on the variable amount while the vehicle speed is above the creep speed range.

8. The engine control apparatus according to claim 1, wherein the deceleration period is from when the vehicle has started to decelerate to when the vehicle speed has decreased below the stop permission speed.

* * * * *